Patented July 9, 1946

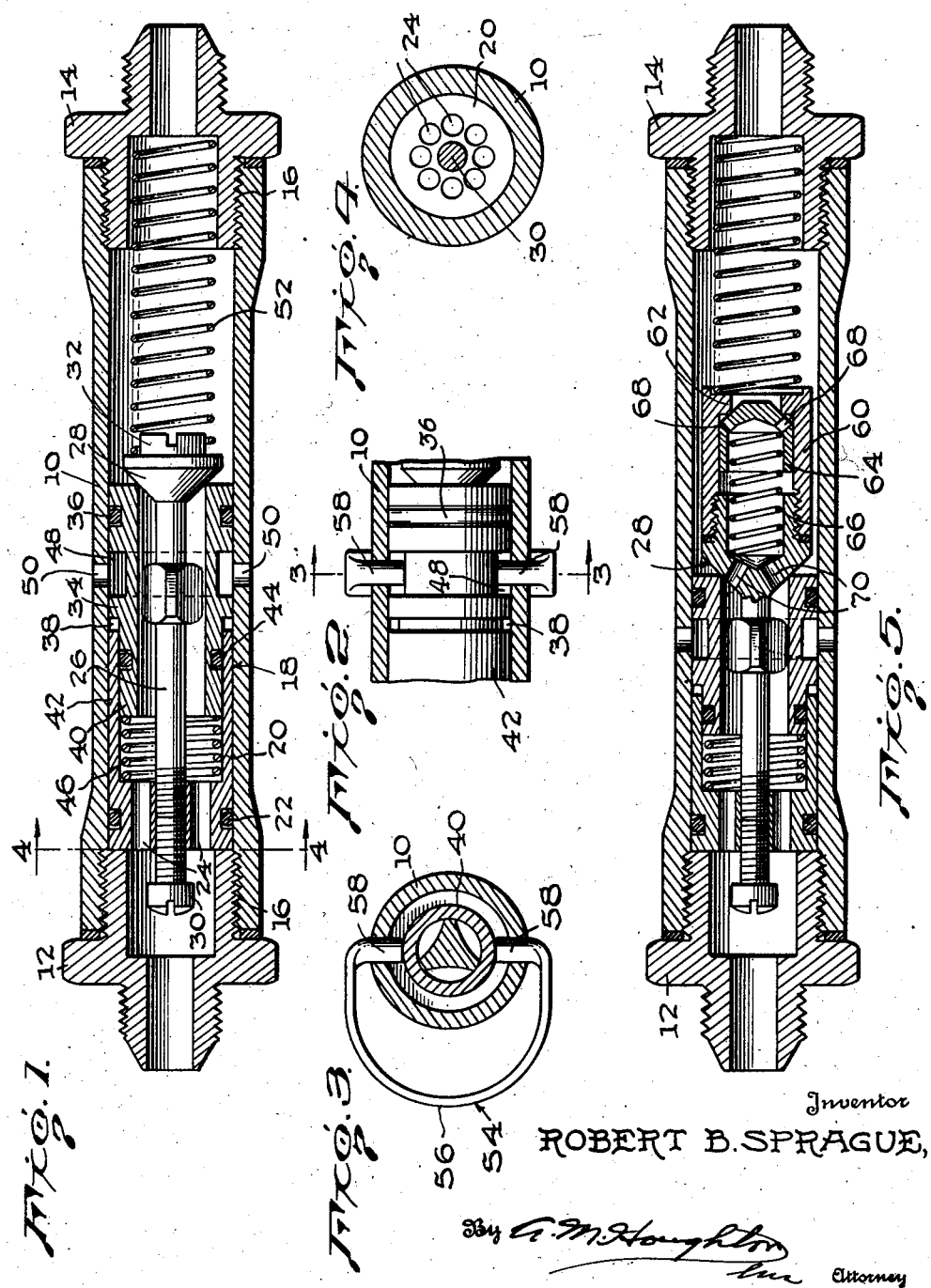

2,403,689

UNITED STATES PATENT OFFICE 2,403,689

FLUID LOCKOUT DEVICE

Robert B. Sprague, Long Beach, Calif., assignor to Hoof Products Company, Chicago, Ill., a corporation of Illinois Application August 28, 1942, Serial No. 456,563

19 Claims. (Cl. 137—153)

The present invention relates to a safety device and is more particularly concerned with a fluid pressure device adapted to seal off the pressure in response to downstream failure.

Yet more particularly, the present invention is concerned with a unit adapted for disposition within a fluid pressure supply line for supplying any predetermined restricted flow under elevated operational pressure. Where, however, failure occurs at a point downstream from the present device, as for example by breakage of the conduit, the present structure immediately functions to positively seal off the line preventing excessive loss of hydraulic fluid or pressure from the supply system.

Many devices with which I have been hitherto aware depend on differential inlet flows for their operation. The present invention, however, provides a device operative to open under a predetermined back pressure and to close positively when this back pressure is released.

It is accordingly an important object of the present invention to provide a safety device as above, having a valve operative under normal back pressure to open a predetermined amount permitting flow of hydraulic fluid under pressure and at a controlled rate but adapted upon release of the back pressure or tendency toward excessive flow, to move to closed position where the entire actuating pressure is applicable at all times to effect a positive valve closing action.

Another important object of the present invention contemplates the provision of a lockout or safety device as above, which is adjustable to accommodate any desired flow of fluid over a selected range and thus adapted to cut out sharply at a predetermined degree of excessive flow.

Yet further objects of the present invention are to provide a construction, as above, susceptible of being opened selectively from the exterior in order to facilitate air bleeding of the lines; and to provide a valve structure which is preferably normally closed during the periods of disuse.

Yet other and further objects will be apparent from the following specification and drawing, wherein:

Fig. 1 is the sectional view taken centrally through a unit constructed in accordance with the present invention, Fig. 2 is a detailed view of the central portion thereof showing the arrangement for air bleeding;

Fig. 3 is a detailed sectional view taken on line 3—3 of Fig. 2,

Fig. 4 is a sectional detailed view taken on the line 4—4 of Fig. 1, and

Fig. 5 is a sectional view the same as Fig. 1, but showing a somewhat modified form of device.

The embodiment disclosed in Figs. 1 to 4 for the purpose of illustrating the broad concepts of the present invention comprises a generally cylindrical body member or cylinder chamber 10 provided with inlet and outlet fittings 12 and 14 at either extremity thereof. It will be noted that the two fittings are threadedly engaged within the cylinder as at 16, whereby the internally extending portion of each fitting provides annular shoulders which, as will hereinafter appear, form effective axial abutments for the internally acting parts of the unit.

Internally the cylinder is provided with a shiftable valve unit comprising a two-part piston 18. The piston structure 18 includes a cylindrical piston member 20 slidably arranged within the cylinder and provided with an annular packing seal 22 disposed within a suitable ring groove. The piston 20 is provided with a plurality of annularly disposed ducts 24, see Figs. 1 and 4, permitting the free passage of fluid. The central portion threadedly and adjustably accommodates an axial extension 26 consisting of a stem or shank supporting a tapered valve head 28 at its outer extremity. Aside from being threadedly engaged within the piston 20 the valve stem is adapted to be selectively locked in any adjusted position by means of a set or jamb screw 30. A slotted portion 32 on the extremity of the valve member 28 is accessible through the bore in the outlet fitting 14 for purposes of adjustment.

The second portion of the two-part piston assembly 18 comprises a cylindrical member 34 telescopically embraced by piston 20 and similarly slidable axially in the cylinder 10 and sealed at its outermost extremity by the packing ring 36. This piston member 34 is shouldered as at 38 providing an axial projection 40 received within a complementary projection 42 on the relatively movable piston member 20. A fluid seal is maintained between these two relatively movable pistons by means of a resilient sealing ring 44.

From the foregoing, it will be apparent that the piston member 34 in reality comprises a shiftable valve member adapted to co-act with the tapered valve head 28 for closing the passage. The last-named piston member is urged toward a valve closing position by a compression spring 46 acting oppositely against the two piston members.

The piston or valve member 34 is provided with an annular circumferential recess 48 normally opposite a pair of diametrically disposed apertures 50 in the wall of the cylinder 10 for permitting exterior control as will hereinafter appear more in detail.

Attention is particularly directed to the fact that the entire valve assembly is relatively shiftable as a unit within the cylinder, being normally maintained at the position shown in Fig. 1 by means of a helical coil spring 52 acting against the tapered valve member 28 and the outlet fitting 14, as shown. In operation the device is located within an oil pressure line as for example in the hydraulic line adapted to actuate the so-called landing carriage strut of an aircraft landing gear. The inlet fitting 12 will normally be associated with the source of high pressure through a suitable control valve not shown. It is sometimes advantageous to throttle the line from the outlet fitting 14 through a suitable restrictor unit in order to assure maintenance of adequate back pressure. The restrictor unit will be selected in accordance with the rate of fluid flow desired in actuating the strut and the present valve or lockout unit may be adjusted through the agency of adjustment members 30 and 42, in order to accommodate a flow somewhat larger than that of the restrictor. It will be appreciated from the foregoing that the use of a restrictor is not necessary with the systems which inherently set up the required back pressure. As examples of such systems not requiring a restrictor may be mentioned, those wherein the valve is used in conjunction with a brake cylinder held in closed position by springs exerting an adequate pressure equivalent, or systems involving pressure relief units set to open at a higher back pressure than that required to operate the valve.

In operation, therefore, it will be apparent that the application of pressure to the inlet side of the device results in the internal piston structure shifting to the right against coil spring 52 until sufficient back pressure has been set up to separate the valve members 34 and 28. From the foregoing it will be apparent that this action occurs under the influence of the differential in pressure forces acting upon the retractable piston 34. Thus, for example, the compression spring 46 normally tends to hold the valve members 34 and 28 in relatively closed position, and this action is supported by the pressure at the inlet fitting. In opposition to those valve closing forces is the back pressure acting against the opposite extremity of the piston or valve member 34. It should be noted, however, that the effective area of member 34, exposed to back pressure, is considerably larger than the area effectively exposed to the inlet pressure. In short the shoulder 38 being exposed to atmospheric pressure through the agency of the apertures 59 detracts from the effective closing forces and permits a relatively restricted back pressure to open the valve. Therefore the valve may open a predetermined amount to permit the restricted flow to the strut. If, however, excess leakage should occur in the outlet line, the back pressure is entirely or largely released with the result that the shiftable valve member 34 is no longer maintained open and seats positively against the tapered valve head 28 subject to the closing action of the spring 46 in addition to the positive pressure applied at the inlet. This will obviously tend to compress the helical spring 52, shifting the entire internal piston structure over to the right, as shown in Fig. 1, toward the point where it is positively stopped by the outlet fitting 14. In short, the conduit becomes automatically sealed off upon failure and remains so as long as the application of fluid pressure continues.

The invention provides a simple and effective means for bleeding the line of air during initial assembly of the device, shown more clearly in Figs. 2 and 3. To this end there is provided an adjunct in the form of a key or locking element 54 comprising a resilient handle portion 56 provided at its extremities with opposed, inwardly extending co-axial pins 58. When snapped through the diametrically opposite apertures 50, of the cylinder 10, the pins engage the annular recess 48 and prevent the relatively shiftable piston 34 from moving to the right. Accordingly, when a small operative pressure is applied the valve member 28 and the rigidly associated parts tend to move to the right whereas the relatively shiftable piston 34 being retained against movement open relatively thereto and may be so maintained until the lines are adequately swept out. The fitting 54 is readily removable at this time to permit the device to operate in its normal manner.

As shown in Fig. 5, a somewhat modified form of construction is arranged to facilitate return flow of fluid in accordance with the requirement of conventional hydraulic systems. To this end the tapered valve member 28 is provided with a cylindrical extension 60 embodying a return check valve construction. Thus the cylindrical body of the check valve is provided with an inwardly projecting annular flange 62 adapted to co-act with a shiftable valve member 64 slidably arranged within the barrel of the cylinder extension 60 and normally maintained in sealing engagement against the flange or shoulder 62 by compression spring 66. Aperatures 68 in the check valve member 64 and aperatures 70 in the tapered valve head permit return flow when the shiftable member 64 is spaced from the sealing flange 62.

In operation therefore it will be seen that the check valve remains closed upon application of pressure to the inlet fitting 12 but may be freely opened against the relatively light tension of the spring 66 when the pressure is released at 12 and while a back or return pressure exists at the fitting 14.

Flow through the present device normally occurs through the inlet and the passages 24, past the spring 46 and through the internal bore in the sleeve 34. When the valve elements are in open position flow occurs past the tapered surface of the valve member 28, through the chamber embracing the spring 52 and outwardly through the outlet.

It is to be understood that the embodiment disclosed in Figs. 1 to 4 is similarly adapted to permit return flow and thus susceptible to use in systems wherein the conduit carries a return flow. In short, it will be readily apparent from the disclosure that return flow acts to open the valve system by forcing the valve unit against the shoulder formed by fitting 12. At this time the valve member 34 being exposed at its right-hand-most extremity to the return pressure, telescopes into the piston 20 thus allowing the valve to open. The modified construction shown in Fig. 5, however, normally permits the return flow at a much lower predetermined pressure than might be obtainable in the construction shown in Fig. 1.

The present invention provides a simple and effective safety device wherein a valve construction normally closing the hydraulic lines opens to permit any flow below a predetermined minimum provided that a normal back pressure exists. When, however, back pressure is released, the device remains closed, effectively preventing excessive loss of hydraulic fluid. The device moreover operates to positively seal off the outlet line. The effective inlet pressure at times where the action of the safety lockout comes into effect is applicable in full to maintain the valve in closed position. However, upon partial or entire release of this pressure the valve still remains closed to prevent leakage. The construction moreover is adjustable by suitable tools applied through the inlet and outlet fittings to any desired restriction of flow within limits of valve design.

It is important to note moreover that the present device is continually operative to permit return flow even after failure of the line. Thus, for example even though the valve is shut off on pressure flow due to a broken or leaking line, it is, however, still adapted to open and permit return flow where such a tendency still exists in the line. Moreover the device remains continually operative to positively lock out or seal the line upon re-application of pressure at the inlet fitting. In short the present construction is not at all incapacitated by exercise of its protective function and remains continually effective to conserve the fluid in the hydraulic system at all times.

Obviously the invention is not limited to the particular structure of invention disclosed herein but is capable of further modification and changes without departing from the spirit and scope of the present invention.

What I claim is:

1. In a hydraulic lockout device of the class described, a chamber having an inlet and outlet valve means within the said chamber for controlling communication between the inlet and outlet and comprising a pair of valve members, means normally urging said valve members to relatively closed position, at least one of said valve members having a portion exposed to the action of back pressure at said outlet and urged thereby toward open position and an oppositely acting portion of relatively restricted area subjected to inlet pressure for urging the valve member toward closed position said valve being operative to shift towards open position when the back pressure reaches a value lower than the inlet pressure by a predetermined differential.

2. A fluid lockout device of the class described comprising in combination a normally closed valve unit comprising a pair of valve members shiftably disposed within a chamber having an inlet and an outlet, said valve unit being located between said inlet and said outlet, means yieldably holding said valve members of the unit in relatively closed position and being adapted to open at a predetermined relative back pressure at the outlet which is less by a predetermined amount than the inlet pressure, and means for setting up an operative back pressure at said outlet fitting in advance of opening of said valve, said last-named means including a spring urging the valve unit away from the outlet and adapted to yield upon application of an inlet pressure for displacing fluid to the outlet.

3. In a fluid lockout device having an inlet and outlet, valve means having differential pressure areas between the inlet and outlet comprising a pair of relatively shiftable valve members adapted to be maintained in closed position by inlet pressure in the absence of a substantial back pressure at the outlet and operative to open at an outlet pressure which is less by predetermined amount than the inlet pressure, and means insertable from the exterior of the device adapted to maintain said valve members in open position for clearing the lines.

4. A hydraulic lockout of the class described comprising a chamber having inlet and outlet means, a unitary valve means shiftable between the inlet and outlet in the chamber, said unitary valve means comprising a pair of valve members, at least one being subjected oppositely to inlet and outlet pressures and being constructed and arranged to open at an outlet pressure which is less by a predetermined differential than the inlet pressure but closing under all conditions where the outlet pressure bears a value to the inlet pressure which is substantially less than said differential and yieldable means urging said unitary valve means toward a position adjacent the inlet and yieldable to permit movement toward the outlet.

5. A hydraulic lockout of the class described comprising a chamber having inlet and outlet means, a unitary valve means shiftable between the inlet and outlet in the chamber, said unitary valve means comprising a pair of valve members, at least one of said valve members having portions subjected to the action of the outlet pressure tending to urge the valve to open position, and portions subjected to inlet pressure action to urge the valve toward closed position, said outlet portions having an effective area substantially larger than the effective area of the portions subjected to inlet pressure by a predetermined differential whereby said valve unit opens when the pressure at the outlet reaches a value bearing a predetermined pressure differential relationship with the inlet pressure, resilient means holding said valve in closed position when the outlet pressure has a value lower than said differential, and yieldable means urging said valve unit to a position adjacent the inlet and yieldable to permit the unit to shift toward the outlet position under the influence of inlet pressure whereby to induce an increased pressure adjacent the outlet.

6. A fluid lockout device as defined in claim 9 comprising means actuable from the exterior of the chamber and engageable with a relatively movable portion of said valve means and adapted to hold said portion whereby the valve is maintained in open position under the influence of force tending to shift it toward the outlet.

7. A hydraulic lockout device as defined in claim 4 comprising means for selectively holding one of said valve members against closure for clearing the lines.

8. A hydraulic lockout device as defined in claim 5 comprising means for selectively holding one of said valve members against closure for clearing the lines.

9. A fluid lockout device of the class described comprising a chamber having an inlet and an outlet, a pair of mating valve members one of which has differential pressure areas between the inlet and outlet of said chamber to close said outlet and adapted to permit flow therethrough at a predetermined relative back pressure which is less by a predetermined amount than the inlet pressure, said valve means being relatively shiftable as a unit within the chamber and toward said outlet until back pressure causes relative movement of the valve parts, whereby shifting of the valve within the chamber displaces fluid toward the outlet for initially setting up an operative back pressure.

10. In a hydraulic lockout device of the class described, the combination comprising a chamber provided with inlet and outlet means, a unitary valve construction made up of a plurality of valve members one of which has differential pressure areas within said chamber, said unitary valve being operative under the influence of a back pressure at the outlet which is less by a predetermined amount than the inlet pressure, said valve unit being yieldably disposed adjacent the inlet for movement toward the outlet until back pressure causes relative movement of the valve parts whereby shifting of the valve unit toward the outlet displaces the hydraulic fluid toward the outlet for setting up an operative back pressure.

11. An hydraulic lockout device of the class described comprising a chamber having inlet and outlet means, independently movable mating valve members so mounted in said chamber as to be at times movable as a unit therein, one of which valve members has differential pressure areas and operative to permit fluid flow under a substantial back pressure which is less by a predetermined amount than the inlet pressure, said valve means being adapted upon the release of back pressure to move to closed position.

12. An hydraulic lockout device of the class described comprising a chamber having inlet and outlet means adapted for interposition in the pressure line of an hydraulic system, a pair of independently movable mating valve members so mounted in said chamber as to be at times movable as a unit therein, one of which has differential pressure areas normally closing communication between the inlet and outlet but adapted to move to open position upon the application of a back pressure at the outlet which is less by a predetermined amount than the inlet pressure.

13. An hydraulic lockout device of the class described comprising a chamber having inlet and outlet means, a pair of mating valve members, telescopically nested, mounted in the chamber for shiftable movement as a unit toward the outlet, one of which valve members has differential pressure areas and which is operative to permit fluid flow under substantial back pressure which is less by a predetermined amount than the inlet pressure, said valve members being adapted upon release of back pressure to move to closed position.

14. In a fluid lockout device having an inlet and an outlet, valve means between the inlet and outlet comprising a pair of relatively shiftable valve members one of which has differential pressure areas and operative to open at an outlet pressure which is less by a predetermined amount than the inlet pressure and adapted to be maintained in closed position by inlet pressure in the absence of a substantial back pressure at the outlet, and spring means insertable from the exterior of the device and adapted to maintain said valve members in open position for clearing the line.

15. In a lockout device of the class described, a chamber having an inlet and outlet, valve means within said chamber for controlling communication between the inlet and outlet, said valve means comprising a valve member, a complementary coacting valve member mounted in relatively shiftable relation for movement toward sealing engagement with said first named valve member, means urging said second named valve member toward valve closing position, said second named valve member having oppositely acting portions presenting differential pressure areas exposed to inlet and outlet pressure conditions and being shiftable to valve opening position when the back pressure reaches a value lower than the inlet pressure by a predetermined pressure differential, said second named valve member being operative at all relatively lower back pressures to move to valve closing position.

16. An hydraulic lockout device of the class described comprising a chamber having inlet and outlet means, normally closed valve means comprising a pair of independently movable valve members coacting as a valve head and valve seat and so mounted in said chamber as to be at times movable as a unit therein, one of said members having differential pressure areas operative to open and permit fluid flow under substantial back pressure which is less by a predetermined amount than the inlet pressure, and adapted upon release of back pressure to move to closed position and to maintain closed position under the influence of pressure applied to the inlet.

17. An hydraulic lockout device of the class described comprising a chamber having inlet and outlet means, normally closed valve means comprising a pair of independently movable valve members coacting as a valve head and valve seat and so mounted in said chamber as to be at times movable as a unit therein, one of said members having differential pressure areas operative to open and permit fluid flow under substantial back pressure which is less by a predetermined amount than the inlet pressure, and adapted upon release of back pressure to move to closed position and to maintain closed position under the influence of pressure applied to the inlet, said member being operable under increased back pressure to move from closed position and permit return flow from outlet toward inlet.

18. In a fluid lockout device having an inlet and an outlet, valve means between the inlet and outlet comprising a pair of relatively shiftable valve members one of which has differential pressure areas and operative to open at an outlet pressure which is less by a predetermined amount than the inlet pressure and adapted to be maintained in closed position by inlet pressure in the absence of a substantial back pressure at the outlet, and means insertable from the exterior of the device to engage and maintain said valve members in open position for clearing the line.

19. In a fluid lockout device having an inlet and an outlet, valve means between the inlet and outlet comprising a pair of relatively shiftable valve members one of which has differential pressure areas and operative to open at an outlet pressure which is less by a predetermined amount than the inlet pressure and adapted to be maintained in closed position by inlet pressure in the absence of a substantial back pressure at the outlet, and means insertable through openings in opposite sides of the casing to engage one of said valve members and maintain said members in open position for clearing the line.

ROBERT B. SPRAGUE.